United States Patent
Schnaare

(10) Patent No.: US 9,167,423 B2
(45) Date of Patent: Oct. 20, 2015

(54) WIRELESS HANDHELD CONFIGURATION DEVICE FOR A SECURABLE WIRELESS SELF-ORGANIZING MESH NETWORK

(75) Inventor: Theodore Henry Schnaare, Carver, MN (US)

(73) Assignee: Rosemount Inc., Eden Prairie, MN (US)

( * ) Notice: Subject to any disclaimer, the term of this patent is extended or adjusted under 35 U.S.C. 154(b) by 2218 days.

(21) Appl. No.: 11/818,128

(22) Filed: Jun. 13, 2007

(65) Prior Publication Data
US 2008/0082698 A1 Apr. 3, 2008

Related U.S. Application Data

(60) Provisional application No. 60/848,607, filed on Sep. 29, 2006.

(51) Int. Cl.
| | |
|---|---|
| *G06F 15/16* | (2006.01) |
| *H04W 12/04* | (2009.01) |
| *H04W 84/18* | (2009.01) |
| *H04W 84/22* | (2009.01) |

(52) U.S. Cl.
CPC .............. *H04W 12/04* (2013.01); *H04W 84/18* (2013.01); *H04W 84/22* (2013.01)

(58) Field of Classification Search
CPC ............................. H04L 67/16; H04L 63/0421
USPC .................. 709/245, 250, 229; 370/278, 338
See application file for complete search history.

(56) References Cited

U.S. PATENT DOCUMENTS

| | | | |
|---|---|---|---|
| 5,560,021 | A | 9/1996 | Vook et al. |
| 5,862,391 | A | 1/1999 | Salas et al. |
| 6,301,527 | B1 | 10/2001 | Butland et al. |
| 6,363,062 | B1* | 3/2002 | Aaronson et al. ............. 370/348 |
| 6,374,311 | B1 | 4/2002 | Mahany et al. |
| 6,721,303 | B1* | 4/2004 | Menzel et al. ................ 370/347 |
| 6,731,946 | B1 | 5/2004 | Stanwood et al. |
| 6,775,276 | B1 | 8/2004 | Beser |
| 6,859,831 | B1 | 2/2005 | Gelvin et al. |
| 2002/0065631 | A1 | 5/2002 | Loechner |

(Continued)

FOREIGN PATENT DOCUMENTS

| | | |
|---|---|---|
| JP | 2004040336 A | 2/2004 |
| JP | 2004328269 A | 11/2004 |
| WO | WO 03/023536 | 3/2003 |

OTHER PUBLICATIONS http://en.wikipedia.org/wiki/Mobile_ad_hoc_network May 21, 2012.*

(Continued)

*Primary Examiner* — Randy Scott
(74) *Attorney, Agent, or Firm* — Kinney & Lange, P.A.

(57) ABSTRACT

A self-organizing mesh network is made up of individual devices configured to use other network devices to pass data from one point to another. The network also includes a secondary operating mode that accommodates handheld and other non-fixed transient network nodes. Each device in the network maintains a configuration link that is used to detect the presence of a handheld device. The handheld device uses the configuration link to identify nearby network devices. A user of the handheld device can then select one of the network devices and establish a small point-to-point subnetwork between the handheld device and the selected network device.

12 Claims, 3 Drawing Sheets

(56) References Cited

U.S. PATENT DOCUMENTS

| | | | |
|---|---|---|---|
| 2003/0185183 A1* | 10/2003 | Lohtia et al. | 370/338 |
| 2004/0001084 A1 | 1/2004 | Shrinidhi et al. | |
| 2004/0032853 A1 | 2/2004 | D'Amico et al. | |
| 2004/0054794 A1* | 3/2004 | Lantto et al. | 709/229 |
| 2004/0100929 A1* | 5/2004 | Garcia-Luna-Aceves | 370/338 |
| 2004/0125753 A1* | 7/2004 | Mahany et al. | 370/254 |
| 2004/0169583 A1* | 9/2004 | Meier | 340/5.31 |
| 2004/0184426 A1* | 9/2004 | Tan | 370/338 |
| 2004/0259555 A1 | 12/2004 | Rappaport et al. | |
| 2005/0048974 A1* | 3/2005 | Kim et al. | 455/436 |
| 2005/0119001 A1 | 6/2005 | Watanabe | |
| 2005/0122929 A1 | 6/2005 | Zuniga | |
| 2005/0149940 A1 | 7/2005 | Calinescu et al. | |
| 2005/0152305 A1 | 7/2005 | Ji et al. | |
| 2005/0164684 A1 | 7/2005 | Chen et al. | |
| 2005/0192727 A1 | 9/2005 | Shostak et al. | |
| 2005/0201340 A1 | 9/2005 | Wang et al. | |
| 2005/0201349 A1 | 9/2005 | Budampati | |
| 2005/0226183 A1* | 10/2005 | Penumetsa | 370/329 |
| 2005/0238058 A1 | 10/2005 | Peirce, Jr. et al. | |
| 2005/0281215 A1 | 12/2005 | Budampati et al. | |
| 2005/0282494 A1 | 12/2005 | Kossi et al. | |
| 2006/0002368 A1 | 1/2006 | Budampati et al. | |
| 2006/0029061 A1* | 2/2006 | Pister et al. | 370/389 |
| 2006/0111040 A1 | 5/2006 | Jenkins et al. | |
| 2006/0146745 A1* | 7/2006 | Cai et al. | 370/328 |
| 2006/0203795 A1 | 9/2006 | Welborn et al. | |
| 2006/0227729 A1 | 10/2006 | Budampati et al. | |
| 2006/0274644 A1 | 12/2006 | Budampati et al. | |
| 2006/0274671 A1 | 12/2006 | Budampati et al. | |
| 2006/0287001 A1 | 12/2006 | Budampati et al. | |
| 2007/0030816 A1 | 2/2007 | Kolavennu | |
| 2007/0030832 A1 | 2/2007 | Gonia et al. | |
| 2007/0189247 A1* | 8/2007 | Wang et al. | 370/338 |
| 2007/0230396 A1* | 10/2007 | Watanabe | 370/329 |
| 2007/0297366 A1* | 12/2007 | Osann | 370/331 |
| 2008/0130615 A1* | 6/2008 | Kashiwagi et al. | 370/343 |

OTHER PUBLICATIONS

"Wireless Mesh Networks: A Survey"—Akyildiz et al, Elsevier, Jun. 2004 http://www.ece.gatech.edu/research/labs/bwn/surveys/mesh.pdf.*

International Search and Written Report for PCT/US07/19397.

Dust Networks, "Technical Overview of Time Synchronized Mesh Protocol," at <http://www.dustnetworks.com/about/library/white-papers/technical-overview-tsmp> (last updated Jun. 20, 2006, 18 pages).

Cisco, "Wireless LAN Controller Mesh Network Configuration Example," at <http://www.cisco.com/application/pdf/paws/70531/wlc-mesh-config.pdf> (last updated Sep. 8, 2006, 13 pages).

First Office Action from the Chinese State Intellectual Property Office for Chinese Patent Application No. 200780040159.4.

Supplemental European Search Report from EP Application Serial No. 07837770.2; dated Jun. 11, 2013, 3 pages.

Notification of Reasons for Rejection from JP Application Serial No. JP2009-530354, dated Dec. 3, 2012, 3 pages.

* cited by examiner

WIRELESS HANDHELD CONFIGURATION DEVICE FOR A SECURABLE WIRELESS SELF-ORGANIZING MESH NETWORK

CROSS-REFERENCE TO RELATED APPLICATION

This application claims priority from provisional application Ser. No. 60/848,607, filed Sep. 29, 2006, which is incorporated by reference.

BACKGROUND OF THE INVENTION

This invention relates generally to self-organizing mesh networks. In particular, the invention relates to a wireless handheld configuration device and an operating mode that allows the handheld device to communicate with a selected device of a self-organizing mesh network.

A self-organizing mesh network is a communications network made up of individual devices that are configured to use other networked devices to reliably pass data from one point to another. Ideally, each device has many paths available for passing data to its intended destination. When a new device joins the network, a network manager provides the new device with a schedule which the new device will use to talk to other devices in the network. Each device in the network is provided with "slots" (specific times and radio frequencies) for passing data to or from one or more "children" and one or more "parents". Using different times and frequencies allow many devices to pass messages in the same space without collisions. Frequency hopping also helps to secure the data that is being passed in the network. Secured self-organizing networks frequently employ authentication and encryption to further protect the network. While these attributes result in a very secure and reliable network, they also make it difficult and inefficient to use a wireless hand held configuration device in the network, because it may take several minutes for the device to be recognized in the network and to establish necessary communication links to the wireless devices to be configured. The presence of such a "transient" participant in the network can also disturb the network, making it less efficient and more power hungry as the device joins, moves around in and un-joins the network.

Secure self-organizing mesh networks of the type in question use a process known as "joining" to incorporate new devices into the secured network. During the joining process, a number of information exchanges and configurations take place.

The new device uses a network pre-determined channel to discover similar devices within radio range. These are the existing network nodes the new device has available to it in order to gain membership into the network. The presence of each device within earshot is recorded. Later in the joining process, the new device will provide its "neighbor" list to the network manager so that the network manager can determine the links that must be established to allow the new device to participate in the network. The network manager also needs to be aware of "excess" neighbors not needed for the new device to communicate on the network. The network manager must ensure that the newly established links do not interfere with the pre-existing links of these neighbor devices.

The new device uses its pre-configured security information to decode a joining message from the manager and sends back the expected security response along with other information necessary for the manager to establish links from the new device to other devices in the network.

The new device and the new parents and children receive and implement configuration information from the network manager to establish the required links. The new device is then fully joined and participating in the network.

In most networks, the joining process described above happens only when new devices join the network. The process may take some time (15 to 20 minutes depending on the network) but since it happens very infrequently, the impact is minor. A wireless handheld device used to interrogate and configure devices in the network may, however, join many times as it is moved around to configure different devices. It is not practical for this type of device to join the network as if it were a standard fixed position device. Not only would this be extremely inconvenient for the user to wait many minutes for the handheld device to join the network, but the frequent joining and un-joining will impact network performance. There is a need for a different method for allowing special devices (such as a wireless handheld configuration device) that are not fixed in the network to join and leave a self-organizing mesh network.

BRIEF SUMMARY OF THE INVENTION

A self-organizing mesh network is provided with a secondary operating mode that accommodates handheld and other non-fixed transient network nodes. Each of the network devices maintains a configuration link to detect presence of a handheld device. The handheld device uses the configuration link to build a "neighbor" list of nearby network devices.

The user of the handheld device can select one of the network devices, and establish a point-to-point subnetwork over which the handheld device and the selected network device can communicate. Once the point-to-point network is established, the handheld device and the network device can pass data securely, for example by using a pre-configured join key to encrypt data, or through an automatic exchange of a temporary configuration encryption key.

DETAILED DESCRIPTION

Figure 1:
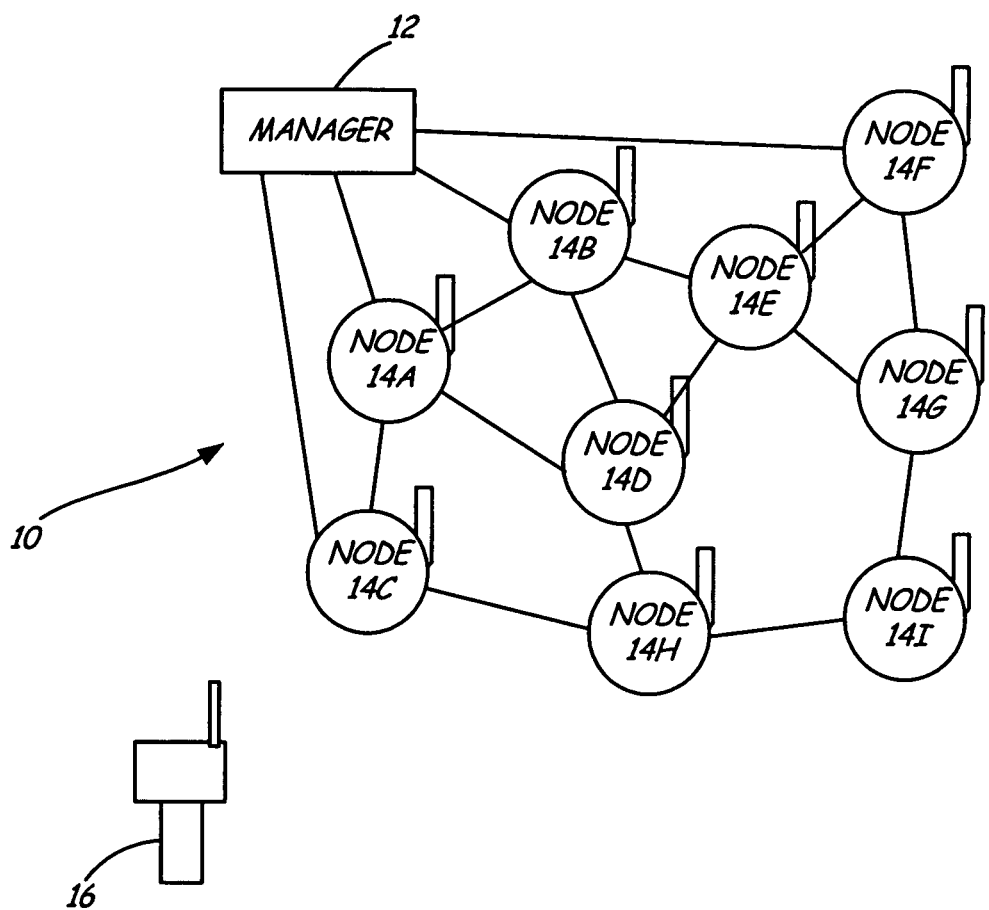
FIG. 1 is a diagram illustrating a self-organizing mesh network.
Figure 2:
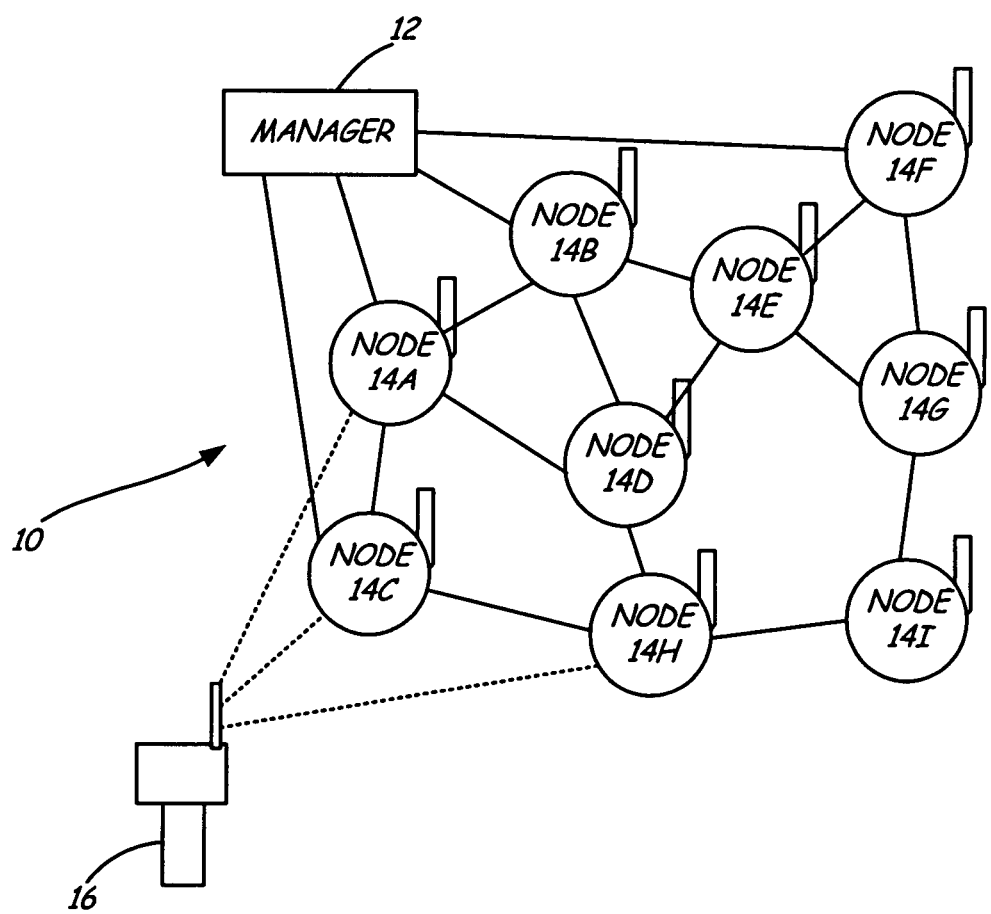
FIG. 2 shows a handheld device utilizing a secondary operating mode of the mesh network to establish contact with one of the network devices.
Figure 3:
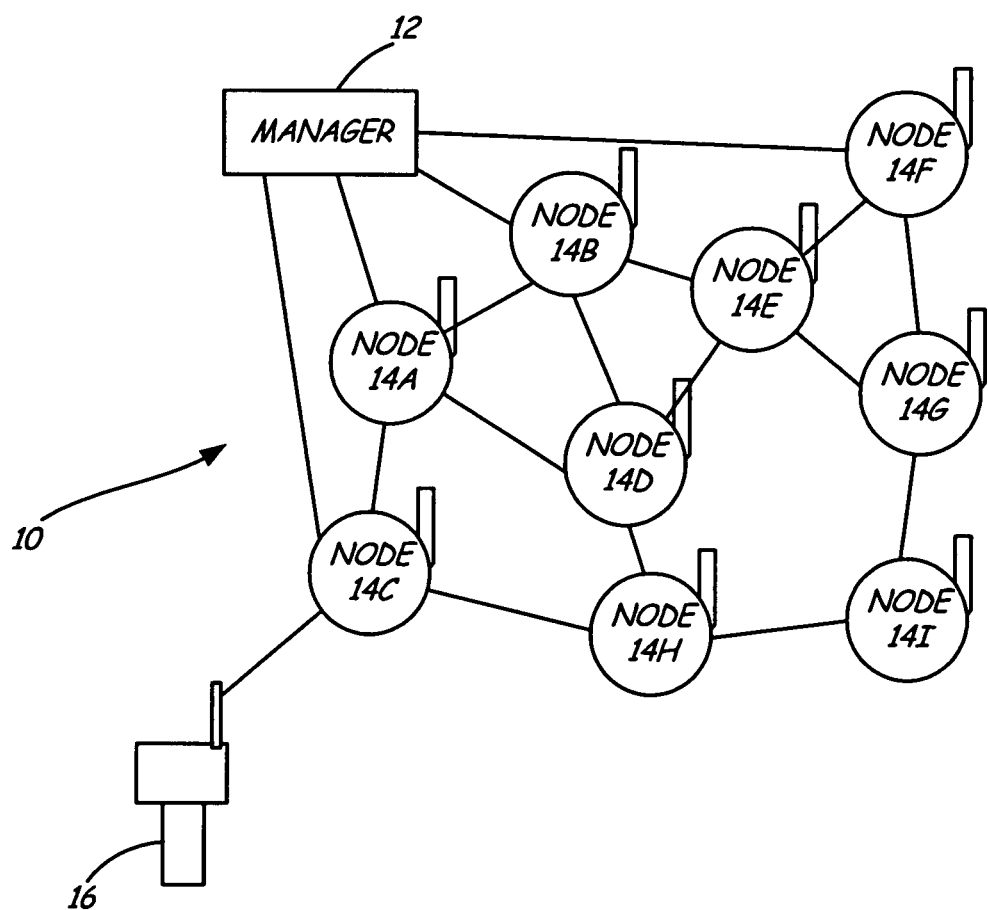
FIG. 3 shows the handheld device communicating with one of the network devices over a point-to-point subnetwork.

FIGS. 1-3 show self-organizing mesh network 10, which includes network manager 12 and individual devices or nodes 14A-14I. Self-organizing mesh network 10 is a wireless communications network in which individual devices 14A-14I pass data through multiple paths.

Network manager 12 may comprise, for example, a software application running on a network gateway or on a host computer. Network manager 12 can communicate directly with some of the devices (in this case devices 14A, 14B, 14C, and 14F) and can communicate indirectly with the remaining devices.

When each of the devices 14A-14I joined network 10, network manager 12 provided that device with a schedule to use in talking to other devices within network 10. Each device is provided with slots representing specific times and radio frequencies which they use to pass data to and from nearby devices that are either children or parents to that device.

In one embodiment, devices 14A-14I are field devices in a distributed industrial process system. The field devices may be transmitters having a sensor (or sensors) to monitor a process parameter such as pressure, temperature, flow rate, or fluid level. Alternatively, the field device may include an actuator for providing the control function in response to a signal received over network 10.

FIGS. 1-3 also show handheld wireless communicator or configuration device 16, which may be used by an engineer or technician to interrogate and configure individual devices 14A-14I in network 10. Handheld configuration device 16 is capable of wireless communication with each of nodes 14A-14I, and may be moved so that it is near a particular device during the interrogation or configuration process.

Handheld device 16, however, presents a problem with respect to joining and leaving network 10. It is not practical for wireless handheld device 16 to join network 10 in the same way as a standard fixed position device (like devices 14A-14I). The time delays required to join network 10 and the frequent joining and leaving of network 10 by wireless handheld device 16 would have a negative impact on performance of network 10.

In the embodiment shown in FIGS. 1 and 2, network 10 has both a primary operating mode in which devices 14A-14I communicate with one another and network manager 12, as well as a secondary operating mode that allows establishment of a point-to-point subnetwork between wireless handheld device 16 and one of the devices 14A-14I of network 10. This secondary operating mode accommodates a wireless handheld configuration device and other handheld or non-fixed transient network nodes. Each device 14A-14I in network 10 maintains a configuration link that is used to detect presence of handheld device 16 or other transient network nodes. The link includes a special communication slot that all devices 14A-14I share. In other words, all of the devices use the same time and the same frequency for the special communication slot, which is reserved for detecting the presence of handheld decvice 16 and is thereby separate from communication slots of the nework used for ordinary data transfer.

Handheld device 16 is programmed to listen on the special frequency in order to establish contact with nearby devices of network 10. Handheld device 16 will listen for the special frequency over a longer time period than the duration of the special communication slot, because it is not initially synchronized to network 10.

When handheld device 16 detects transmission from one or more of devices 14A-14I, it uses the special communication link to build a neighbor list in a manner that is similar to that used in the standard join process.

As shown in FIG. 2, handheld device 16 is located near nodes 14A, 14C, and 14H. When handheld device 16 has built a neighbor list identifying devices 14A, 14C, and 14H, it then presents a list via a display to the user of handheld device 16. The list identifies those network devices within earshot of handheld device 16. In this particular example, the list would include devices 14A, 14C, and 14H. The user can then select one of those devices to establish communication.

As shown in FIG. 3, the user has selected device 14C. Using only the join key and a network ID (both of which are programmed into handheld device 16), handheld device 16 and network device 14C create a small point-to-point subnetwork. The creation of the point-to-point subnetwork is accomplished through the temporary dedication of currently unused communication slots of network 10 to create opportunities for network device 14C and handheld device 16 to communicate with one another. This point-to-point network can be established entirely without participation of network manager 12, and can be done very rapidly. Once the point-to-point network is established, handheld device 16 and network device 14C can pass data securely either by using the preconfigured join key to encrypt data, or through an automatic exchange of a temporary configuration encryption key.

Upon completion of the configuration process, handheld device 16 terminates the point-to-point subnetwork, and then can be moved to another location in order to configure another one of the devices of network 10. During the time that the point-to-point subnetwork is in existence, the primary operating mode of network 10 continues. Handheld device 16 does not fully join or participate in network 10. Rather, it communicates on an individual basis with only one of the devices of network 10, using communication slots that are not being used by any other device within network 10.

Although the present invention has been described with reference to preferred embodiments, workers skilled in the art will recognize that changes may be made in form and detail without departing from the spirit and scope of the invention.

The invention claimed is:

1. A wireless self-organizing network comprising:
a plurality of devices each configured to use one or more others of the plurality of devices to pass data over the network, each said device using a schedule provided by a network manager to talk with other said devices, and each said device having a common communication slot specified by the schedule for establishing a temporary point-to-point subnetwork without participation of the network manager to alter the schedule, wherein the common communication slot is separate from communication slots of the network used for data transfer among the plurality of devices according to the schedule; and
a handheld wireless communicator capable of communicating with the devices using the common communication slot to establish the temporary point-to-point subnetwork with one of the devices.

2. The network of claim 1, wherein the common communication slot is a common time and frequency shared by the devices for establishing communication with the handheld wireless communicator.

3. The network of claim 1, wherein the handheld wireless communicator builds a neighbor list of devices whose presence has been detected on the common communication slot.

4. The network of claim 3 wherein the handheld wireless communicator displays the neighbor list for user selection of the device with which the temporary point-to-point subnetwork is established.

5. The network of claim 4, wherein the handheld wireless communicator provides a join key and a network ID to the selected device.

6. The network of claim 1, wherein the temporary point-to-point subnetwork uses communication slots of the network not currently being used for passing data among the plurality devices according to the schedule.

7. The network of claim 1, wherein the handheld wireless communicator is configured to listen for temporary point-to-point subnetwork establishment communication on the common communication slot for a longer time period than the duration of the common communication slot specified by the schedule established by the network manager for the plurality of devices.

8. A wireless self-organizing mesh network of individual devices, the network comprising:
a network manager for establishing a primary operating mode and a communication schedule available to all of the individual devices in which data is passed over the mesh network using the individual devices; and a configuration device capable of establishing a temporary point-to-point connection with a selected one of the individual devices using a secondary operating mode of the mesh network, the temporary point-to-point connection being able to operate without alteration of the communication schedule, wherein at least in the second operating mode each of the individual devices includes a common configuration slot specified by the communication schedule for establishing communication with the configuration device, and wherein the common configuration slot is separate from communication slots of the network used for data transfer among the individual devices according to the schedule.

9. The mesh network of claim 8, wherein the configuration slot comprises a time and frequency shared by the individual devices.

10. The mesh network of claim 8, wherein each individual device includes software that allows establishment of the temporary point-to-point connection between the individual device and the configuration device without participation of the network manager.

11. The mesh network of claim 8, wherein communications over the point-to-point connection between the individual device and the configuration device are secured through the use of a network encryption key.

12. The mesh network of claim 8, wherein the configuration device is configured to listen for temporary point-to-point connection establishment communication on the common configuration slot for a longer time period than the duration of the common configuration slot specified by the schedule established by the network manager for the individual devices.

* * * * *